United States Patent Office 2,694,694
Patented Nov. 16, 1954

2,694,694

MANUFACTURE OF EPOXIDE RESINS

Sylvan Owen Greenlee, Racine, Wis., assignor to Devoe & Raynolds Company, Inc., Louisville, Ky., a corporation of New York No Drawing. Application October 17, 1952,
Serial No. 315,421

4 Claims. (Cl. 260—47)

This invention relates to improvements in the production of high melting point high molecular weight epoxide resins which are valuable compositions for use in the manufacture of varnishes, molding resins, adhesives, films, fibers, etc. The invention includes a new process of producing such resins, and the resins so produced.

The process of the present invention is a single step process for producing high molecular weight and high melting point epoxide resins having a melting point in excess of 115° C. and up to 150° C. or higher, whereby such high melting point resins are produced in a relatively short period of time and by a single kettle operation.

High melting point epoxide resins can readily be produced by first producing low melting point epoxide resins and subsequently, by a separate reaction, reacting them with an amount of dihydric phenol less than that corresponding to the epoxide equivalent of the resins, to produce a higher melting point epoxide resin.

The process of the present invention enables high melting point resins to be directly produced by a one step operation, without the preliminary production of a low melting point epoxide resin and a further and second step reaction thereof with additional dihydric phenol.

The high melting point epoxide resins are produced by the reaction of a mixture of a dihydric phenol with epichlorhydrin and sufficient caustic alkali to combine with the chlorine of the chlorhydrin, the proportions of chlorhydrin to dihydric phenol being such as to give directly a high melting point high molecular weight epoxide resin.

The invention is of particular value in the production of high melting point resins from bis-phenol (p,p'-dihydroxy diphenyl dimethyl methane) and epichlorhydrin, enabling resins having a melting point higher than 115° C. and up to around 150° C. or higher to be directly produced in a relatively short cooking time and in a single kettle operation.

In making the high melting point epoxide resins from epichlorhydrin or glycerol dichlorhydrin and dihydric phenols, substantially more than 1 molecular proportion of the difunctional chlorhydrin is used for 1 molecular proportion of dihydric phenol, but, in general, the excess of chlorhydrin is limited, since, with higher ratios of chlorhydrin to dihydric phenol, lower melting point resins are produced. Thus, with bis-phenol and epichlorhydrin, the proportion of chlorhydrin to bis-phenol is more than 1 to 1, but, in general, will be less than 1.2 to 1.

In carrying out the process, the polyhydric phenol and the dichlorhydrin or other chlorhydrin are advantageously reacted with the use of aqueous caustic alkali in amount sufficient to combine with the chlorine of the chlorhydrin, or in amount somewhat in excess. Thus, where the dihydric phenol is reacted with epichlorhydrin, the proportion of alkali used is sufficient to combine with the chlorine of the epichlorhydrin and advantageously somewhat in excess of that amount. When glycerol dichlorhydrin is used with the dihydric phenol, the amount of alkali is sufficient to combine with the chlorine of the dichlorhydrin or advantageously somewhat in excess of that amount.

The reaction of the dihydric phenol and epichlorhydrin or glycerol dichlorhydrin appears to be mainly a reaction which results in straight chain polymeric products such as illustrated by the following formula:

$$R_1—[O—R—O—R_2]_n—O—R—O—R_1$$

where R is the residue of a dihydric phenol, $R_2$ is an intermediate hydroxyl-containing residue of the chlorhydrin or dichlorhydrin, $R_1$ is mainly an epoxy-containing residue, and $n$ represents the degree of polymerization. The high melting point resins are in the nature of diepoxides, i. e., polymeric diglycid ethers of the dihydric phenols.

The above formula of the high melting point polymeric epoxide resins assumes a straight line reaction which appears to be the primary reaction between the dihydric phenol and epichlorhydrin or dichlorhydrin. Reaction is not, however, excluded between the halohydrin and intermediate alcoholic hydroxyl groups such as would give branch chain formulas.

It is difficult to determine the exact nature of the complex polymerization process which takes place but I am led to believe that the reaction is primarily one between the phenolic hydroxyls and the chlorhydrins and to a limited extent one of reaction of halohydrins or epoxide groups with aliphatic hydroxyl groups, and that the resulting complex hydroxy-epoxy compositions are largely straight-chain polymeric products of the formula indicated above and to some extent more complex polydimensional structures.

The dihydric phenols used in making the high melting point epoxide resins may contain the hydroxyl groups in one nucleus as in resorcinol or in different nuclei of fused ring systems as in 1,5-dihydroxynaphthalene or in different nuclei or ring systems attached by chains composed of one or more atoms, in which case the chains should be free from elements which interfere with the reaction of chlorhydrins with the phenolic hydroxyl groups. The dihydric phenols may contain the phenolic hydroxyls in nuclei separated by an aliphatic alcoholic hydroxyl group, such as the group —CH$_2$CHOHCH$_2$—, which dihydric phenols are produced by the reaction of a dihydric phenol with less than the equivalent proportion of epichlorhydrin and caustic alkali sufficient to combine with the chlorine of the epichlorhydrin. The phenolic nuclei or the chains linking phenolic nuclei may contain substituents provided they do not interfere with the desired reaction of the chlorhydrins with the phenolic hydroxyl groups. Illustrative of dihydric phenols which may be used in making the new complex polymerization products are mononuclear phenols such as resoricinol, hydroquinone, catechol, etc. and polynuclear phenols such as bisphenol (p,p'-dihydroxydiphenyl dimethyl methane), p,p' - dihydroxybenzophenone, p,p' - dihydroxydiphenyl, p,p' - dihydroxydibenzyl, bis -(4- hydroxyphenyl) sulfone, 2,2'-dihydroxy 1,1'-dinaphthyl methane, polyhydroxy naphthalenes and anthracenes, and other dihydroxy diphenyl or dinaphthyl methanes, etc.

A particularly advantageous polyhydric phenol for use in carrying out the single stage process of the present invention is bis-phenol (p,p'-dihydroxydiphenyldimethyl methane).

In making the high melting point epoxide resins, the dihydric phenol, e. g., bis-phenol, and the polyfunctional chlorhydrin, e. g., epichlorhydrin, are advantageously mixed together at the outset, together with aqueous alkali which may be used to dissolve or partly dissolve the dihydric phenol to form the polyphenoxide or a monophenoxide either before admixture with the chlorhydrin or after admixture. The amount of caustic alkali added to dissolve or partially dissolve the phenol, and whether present at the outset or added in successive amounts, should be sufficient to combine with the chlorine of the chlorhydrin used. With epichlorhydrin for example the amount of caustic alkali should be equal to or somewhat in excess of the theoretical amount for combining with the chlorine of the epichlorhydrin. With glycerol dichlorhydrin 2 mols of caustic alkali or somewhat more are required for 1 mol of the dichlorhydrin. The presence of an excess of alkali is advantageous in securing completion of the reaction, and also influences the polymerization and the nature of the polymerization products as well as the relative proportions of epoxide groups and terminal hydroxy-containing groups.

Products of somewhat different melting points and different degrees of polymerization can be obtained by regulating the proportions of the reactants used. For making the high melting point high molecular weight epoxide resins, the proportion of epichlorhydrin to dihydric phenol, e. g., bisphenol, should be somewhat in excess of 1:1, but should not be too large an excess. With bis-phenol, as above indicated, the excess of epichlorhydrin should, in general, be less than 1.2 to 1. The yields of resin obtained represent or approximate the theoretical yields, indicating that the complex polymerization products contain the phenolic and chlorhydrin residues in substantially the same proportions in which the reactants are used.

In producing the high melting point epoxide resins by the present process, special pressure equipment is necessary and the reaction which results in the production of the high melting point resin is carried out or is completed under pressure and at temperatures considerably above 100 C.; and the washing of the resin to remove byproduct salt and excess alkali is also carried out under pressure and with the use of preheated water, preheated to a temperature considerably above 100° C.

It is important to use pressure equipment provided with powerful agitating means to effect completion of the reaction at the high temperature under pressure and to enable effective washing with high temperature water to be carried out. The high melting point resin is maintained during its production and washing in a molten or plastic state such that it can be effectively agitated and washed. Thus, an epoxide resin made from bis-phenol and epichlorhydrin and having a softening point of around 125° C. may be prepared and washed in a closed pressure vessel at a temperature above 110–115° C. Higher melting point products, having a melting point of e. g. around 150° C., can be prepared and washed with water heated to around 145 to 150° C.

The special pressure equipment in which the process is carried out is advantageously a steam jacketed kettle equipped with a heavy duty agitator, hot water inlets and outlets, an adjustable level water take-off line, and a gas pressure line with gauge and pressure regulator, as well as a vapor outlet line, a loading opening, and a sight glass in the top of the kettle.

The gas pressure used for maintaining pressure in the kettle both during the production of the resin and during the subsequent washing may be air or a gas such as nitrogen or steam.

A preheater should be provided or means otherwise furnished for supplying hot superheated water to the kettle under pressure for the washing operation.

With high melting point resins which are viscous or taffy-like in character, the washing of the resin will be continued, with effective agitation, until the wash water leaving the kettle shows absence of alkali and of salt.

After the resin is thoroughly washed in the kettle under pressure and after the excess wash water has been drawn off, any small amount of water remaining in or admixed with the resin can readily be removed by reducing the pressure and continuing the heating until a dry resin is obtained which can be discharged from the kettle as a finished resin.

Where an excess of alkali is used in producing the resin, it is important to remove the excess alkali, after the resin is produced, without overheating the resin and causing objectionable reaction, although further reaction to a limited extent may take place during the washing operation. In general, excessive temperatures during washing should be avoided until excess alkali is removed.

High melting point resins of different melting points can be produced by varying the proportions of the dihydric phenol and chlorhydrin used and to some extent by varying the amount of excess alkali and the temperature and duration of the process. The production of higher melting point resins, e. g., melting about 150° C., requires higher temperatures and pressures for carrying out the process and for washing the resin to remove salt and alkali.

The invention will be further illustrated by the following specific examples, but it will be understood that it is not limited thereto.

*Example 1*

The apparatus used was a 7½ gallon steam jacketed pilot plant kettle, capable of operating under pressure and equipped with a heavy duty anchor type agitator, a thermometer, a hot water inlet, an adjustable level water take-off line, a gas pressure line with gauge and pressure regulator, a vapor outlet line and a loading port and sight glass in the top of the kettle.

The kettle was loaded with a mixture of 14,950 parts of water, 1,483 parts of commercial caustic soda, (98.5% NaOH), 17 parts of sodium orthosilicate, and 6,835 parts of bis-phenol. After agitation for several minutes at 50° C., 3,000 parts of epichlorhydrin were added to the reaction mixture and the loading port was closed immediately, agitation being continued. With the exothermic heat of reaction and external heat, the reaction temperature was brought to 115° C. over a period of 30 minutes. Compressed air was introduced and the pressure inside the kettle was adjusted to 25 pounds and held there during a 30-minute reaction period at 115° C. The pressure was then increased to 30–35 pounds to cause the taffy-like resinous product to settle to the bottom of the kettle, and as much as possible of the upper water layer was removed with the adjustable level water take-off line. The taffy-like resin was then washed free from salt and alkali by introducing preheated hot water to the kettle and simultaneously allowing water to flow from the kettle. During the washing period, the resin was continuously agitated. The pressure in the kettle was held at 30–35 pounds, and the temperature was gradually increased from 120° C. to 135° C. After 2½ hours of continuous washing, the water coming from the kettle was neutral. It is important that all of the unreacted alkali, when present, be removed to prevent further polymerization of the resin.

After the washing was completed, as much water as possible was removed from the kettle through the water take-off line. The air pressure line was closed and the steam pressure in the jacket increased to raise the temperature of the resin to 137–138° C. The steam formed on heating the taffy-like resin was slowly released and, after the pressure had been completely released, the loading port was opened and the last traces of water were removed by heating the resin to 140° C. The resin was continuously agitated during the drying process. The hot resin was then poured from the kettle into a receptacle and allowed to cool. The product was a hard, brittle resinous solid having a Durran's melting point of 129° C. and an epoxide equivalent of 1863.

In the above example, the ratio of epichlorhydrin to bis-phenol was about 1.12 to 1; and about 12½% excess sodium hydroxide was used.

*Example 2*

The same kettle referred to in Example 1 was loaded with a mixture of 13,830 parts of water, 1,474 parts of commercial caustic soda, 18 parts of sodium orthosilicate and 6,540 parts of bis-phenol. After several minutes agitation at 50° C., 3050 parts of epichlorhydrin were added to the reaction mixture, with continuous agitation. In general, operating conditions were similar to those referred to in Example 1, with the following variations:

The temperature was raised to 130° C. in 30 minutes; the reaction mixture was held at 130° C. for 1 hour; the kettle pressure during reaction was 39 pounds; the taffy-like resin was washed at 124–127° C. and at 38–42 pounds pressure for 2½ hours; and the resin was dried to a final temperature of 145° C.

The final product produced by this process was a hard resinous solid having a Durran's melting point of 116° C. and an epoxide equivalent of 1484.

In this example, the ratio of epichlorhydrin to bis-phenol was 1.15:1 and the excess caustic soda was about 10%.

*Example 3*

The same kettle referred to in Example 1 was loaded with a mixture of 15,220 parts of water, 1,675 parts of commercial caustic soda, 18 parts of sodium orthosilicate and 6,540 parts of bis-phenol. After several minutes' agitation at 50° C., 3,050 parts of epichlorhydrin was added with continued agitation. In general, the operating conditions were similar to those of Example 1, with the following variations:

The temperature was raised to 130° C. in 30 minutes; the reaction mixture was held at 130° C. for 1 hour; the kettle pressure during reaction was 35 pounds; the taffy-like resin was washed at 130° C. and 38 pounds pressure for 1¾ hours; and the resin was dried to a final temperature of 145° C.

The final product was a hard, brittle, resinous solid having a Durran's melting point of 124° C. and an epoxide equivalent of 1,630.

In this example, the ratio of epichlorhydrin to bis-phenol was 1.15:1, and the excess sodium hydroxide was about 25%.

*Example 4*

The kettle referred to in Example 1 was loaded with a mixture of 15,220 parts of water, 1,742 parts of commercial caustic soda, 18 parts of sodium orthosilicate and 6,540 parts of bis-phenol. After several minutes' agitation at 50° C., 3,050 parts of epichlorhydrin were added to the mixture with continued agitation. In general, the operating conditions were similar to those used in Example 1, with the following variations:

The temperature was raised to 130° C. in 30 minutes; the reaction mixture was held at 130° C. for 1 hour; the kettle pressure during reaction was 35 pounds; the taffy-like resin was washed at 129–131° C. and 40 pounds' pressure for 1¾ hour; and the resin was dried to a final temperature of 145° C.

The final product was a hard, brittle, resinous solid having a Durran's melting point of 139° C. and an epoxide equivalent of 2,065. In this example, the ratio of epichlorhydrin to bis-phenol was 1.15:1, and the excess sodium hydroxide was about 30%.

*Example 5*

A kettle similar to that described in Example 1, but of plant size, was loaded with a mixture of 1,915 pounds of water, 268 pounds of caustic soda, 3 pounds of sodium orthosilicate and 1,140 pounds of bis-phenol. At a temperature of 50° C., 530 pounds of epichlorhydrin were added and the reaction temperature was brought to 130° C. in 30 minutes. After holding the reaction mixture at this temperature for 1 hour, the aqueous layer was drawn off and the taffy-like resin was washed continuously with hot water and at a temperature of 130° C. and a pressure of 40 pounds per square inch, to remove the salt and excess alkali. As much water is possible was then drawn off and the resin was dried by heating to 154° C. The product of this example had a melting point of 151° C. and an epoxide equivalent of 2,842.

In this example, the ratio of epichlorhydrin to bis-phenol was 1.145:1 and the excess caustic alkali was about 15%.

In referring to the epoxide equivalent of the resins of the above examples, this indicates the equivalent weight of the resin per epoxide group. The method used for determining the epoxide content of the epoxide resins was by heating a 1-gram sample of the epoxide composition with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1 N sodium hydroxide using phenolphthalein as indicator, and considering that 1HCl is equivalent to one epoxide group.

In a similar way, other dihydric phenols can be reacted with epichlorhydrin to produce high melting point resins; and glycerine dichlorohydrin can be similarly used in place of epichlorhydrin. Ratios of epichlorhydrin to dihydric phenol will vary with different resins, and with bis-phenol and epichlorhydrin the proportions can be somewhat varied from those indicated in the above examples.

Dihydric phenols which are dihydric phenol polyether alcohols, with one or more intermediate aliphatic alcoholic hydroxyl-containing groups or nuclei, can be similarly used. Complex polyhydric phenol polyether alcohols which are made from 2 mols of dihydric phenol and 1 mol of epichlorhydrin, or from 3 mols of dihydric phenol and 2 mols of epichlorhydrin, with caustic alkali to combine with the chlorine, etc., can thus be used. More complete and higher polymeric polyhydric phenol polyether alcohols can be used which are produced from the reaction of a dihydric phenol with less than the equivalent amount of epichlorhydrin to give polymeric dihydric phenol reaction products containing terminal phenolic hydroxyl groups. Such complex dihydric phenol polyether alcohols may be of a monomeric form, such as one having the following formula

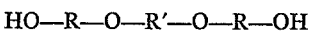

or polymeric products having the following formula or structure:

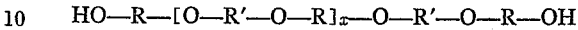

where R is the residue or neucleus of the dihydric phenol, R' is the aliphatic hydroxyl containing nucleus, and $x$ indicates the degree of polymerization, e. g., 1, or 2, or 3, or more. Complex dihydric phenol polyether alcohols thus made from bis-phenol and epichlorhydrin, or resorcinol and epichlorhydrin, etc., in the proportions of 2 mols of the dihydric phenol and 1 mol of epichlorhydrin, or 3 mols of dihydric phenol and 2 mols of epichlorhydrin, or 4 mols of dihydric phenol and 3 mols of epichlorhydrin, etc., can thus be used as the dihydric phenols in the manner above described and illustrated to produce high melting point resins.

In general, the high melting point epoxide resins produced by the present process are soluble, unless too highly polymerized, in solvents such as acetone, methyl ethyl ketone, diacetone alcohol, cyclohexanone, etc. Solutions of the resins can be used in making clear and pigmented varnishes, in making transparent film and filaments, and in impregnating and laminating and coating wood, fabrics and other porous or fibrous materials, etc. When a small amount of a suitable catalyst is added to the solution, the resulting film or coating, on heating, is converted into an infusible insoluble product.

The high melting point epoxide resins are capable of further reaction by polymerization with other reagents to form final reaction products.

It is one of the characteristics of the high melting point epoxide resins that on final polymerization or reaction they tend to expand on hardening and differ in this respect from resins which shrink on hardening. This lack of contraction or slight expansion in the case of molded products on hardening is valuable for many applications, enabling tight fitting molded articles to be obtained.

The high melting point epoxide resins produced by the present process and containing reactive epoxide groups can be reacted with compounds containing active hydrogen, such as amines, and particularly polyamines, amides, mercaptans, polyhydric alcohols, polyimines, etc., to give a wide variety of valuable reaction products. Thus, difunctional reactants or polyfunctional reactants may serve to cross-link different molecules through reaction with terminal epoxide groups and in some cases through intermediate hydroxyl groups. The use of less than the equivalent amount of cross-linking reagents enables modified products to be obtained and in some cases infusible products.

Where the high melting point epoxide resins produced by the present process are further reacted with a polyhydric phenol, approximately equivalent to the epoxide content of the resins, and with the use of a small amount of catalyst such as the alkali salt of the polyhydric phenol, the resulting mixture on heating will react to produce high melting, higher molecular weight and infusible products.

Various polyfunctional cross-linking reactants can be used to react with the higher melting point epoxide resins, such as amines, to produce amine-epoxide products which may be insoluble products, or other polyfunctional reactants such as diisocyanates, dialdehydes, dimercaptans, amides, etc.

Thus the new high melting point epoxide resins and also the compositions containing the initial resin and added dihydric phenol are valuable materials for use in the manufacture of varnishes, molding resins, adhesives, fibers, filaments, etc.

The new higher melting point resins polymerize or further react in the presence of a catalyst to give higher melting and finally infusible products. This polymerization reaction may be carried out after the epoxide composition of the higher melting epoxide resin has been spread out in thin layers, in which case protective films are formed. The polymerization can be carried out in molds to give excellent infusible molded objects. The complex epoxide compositions make excellent bonding materials for glass when polymerized in layers between glass plates. They are likewise useful as material for the bonding and impregnation of wood, for fabric coating and impregnation, for surface coatings, both clear and pigmented, on glass, wood, and metal, etc.

The final infusible polymerization and reaction products made with the high melting point epoxide resins have a remarkable combination of desirable properties, including resistance to water, solvents, alkalies and acids, toughness combined with hardness, flexibility at low temperatures, ability to withstand high temperatures with little or no discoloration, resistance to chemicals, wettability to most pigments, solubility in organic solvents, and hardening of thick films through chemical reactions within the film itself when a suitable catalyst or cross-linking reactant is used so that paint and varnish coatings far beyond the usual thickness can be applied.

Such properties make the new compositions and products made therefrom valuable for many practical purposes.

This application is a continuation-in-part of my prior application Serial No. 250,951, filed October 11, 1951 (now Patent No. 2,615,008), which is a continuation-in-part of my prior application Serial No. 199,932, filed December 8, 1950 (now abandoned); and also a continuation-in-part of my application Serial No. 199,931, filed December 8, 1950 (now Patent No. 2,615,007); said prior applications Serial Nos. 199,931 and 199,932 being continuations-in-part of my prior application Serial No. 617,176, filed September 18, 1945, now abandoned.

I claim:

1. The single stage process of producing high melting point epoxide resins having a melting point above 115° C. which comprises reacting with heating under pressure in a closed vessel a chlorhydrin selected from the class which consists of epichlorhydrin and glycerol dichlorhydrin with p,p'-dihydroxy diphenyl dimethyl methane in the presence of sufficient aqueous alkali to combine with the chlorine of the chlorhydrin, the proportions of chlorhydrin to p,p'-dihydroxy diphenyl dimethyl methane being more than 1:1 and less than 1.2:1, the reaction being carried to a temperature above 110° C. while maintaining pressure in the closed vessel, separating the byproduct salt and any aqueous alkali from the resulting epoxide resin, adding preheated hot water to the resin under pressure in the closed vessel and agitating and washing the resin under pressure with hot water until the wash water is free from salt and caustic alkali, releasing the pressure, and continuing the heating of the resin to free it from residual water.

2. The single stage process of producing high melting point epoxide resins having a melting point between 125° and 150° C., which comprises reacting with heating under pressure in a closed vessel epichlorhydrin and p,p'-dihydroxy diphenyl dimethyl methane in the presence of aqueous caustic alkali somewhat in excess of that required to combine with the chlorine of the epichlorhydrin, the proportions of epichlorhydrin to p,p'-dihydroxy diphenyl dimethyl methane being in excess of 1:1 and less than 1.2:1, the reaction being carried to a temperature above the melting point of the resin while maintaining pressure in the closed vessel, separating byproduct salt and excess alkali from the resulting epoxide resin, adding preheated hot water to the resin under pressure in the closed vessel and agitating and washing the resin under pressure with hot water until the wash water is free from salt and caustic alkali, releasing the pressure and continuing the heating of the resin to free it from residual water.

3. The single stage process of producing high melting point epoxide resins having a melting point above 115° C. which comprises reacting with heating under pressure in a closed vessel, a chlorhydrin selected from the class which consists of epichlorhydrin and glycerol dichlorhydrin with a dihydric phenol free from reactive groups other than phenolic hydroxyl groups in the presence of sufficient aqueous caustic alkali to combine with the chlorine of the chlorhydrin, the proportions of chlorhydrin to the dihydric phenol being more than 1:1 and less than 1.2:1, the reaction being carried to a temperature above 110° C. while maintaining pressure in the closed vessel, separating the by-product salt and any aqueous alkali from the resulting epoxide resin, adding preheated hot water to the resin under pressure in the closed vessel and agitating and washing the resin under pressure with hot water until the wash water is free from salt and caustic alkali, releasing the pressure, and continuing the heating of the resin to free it from residual water.

4. The process according to claim 3 in which the dihydric phenol is a polyhydric phenol polyether alcohol having terminal phenolic hydroxyl groups and at least one intermediate alcoholic hydroxyl group.

References Cited in the file of this patent

FOREIGN PATENTS

| Number | Country | Date |
|--------|---------|------|
| 960,044 | France | Oct. 17, 1949 |